United States Patent [19]
Suh

[11] Patent Number: 6,085,173
[45] Date of Patent: Jul. 4, 2000

[54] METHOD FOR PROCESSING BUSINESS ACTIVITY FINANCIAL DATA

[75] Inventor: Won-kyo Suh, Kwangju-si, Rep. of Korea

[73] Assignee: Eastern Consulting Co., Ltd., Seoul, Rep. of Korea

[21] Appl. No.: 08/714,497

[22] Filed: Sep. 16, 1996

Related U.S. Application Data

[63] Continuation of application No. 08/274,708, Jul. 14, 1994, abandoned.

[30] Foreign Application Priority Data

Jul. 27, 1993 [KR] Rep. of Korea ............ 93-14324

[51] Int. Cl.[7] ............................................ G06F 157/00
[52] U.S. Cl. .................................... 705/30; 705/11
[58] Field of Search .................... 705/30, 33, 34, 705/11

[56] References Cited

U.S. PATENT DOCUMENTS

| | | | |
|---|---|---|---|
| 4,642,767 | 2/1987 | Lerner | 364/406 |
| 5,193,055 | 3/1993 | Brown et al. | 364/406 |
| 5,390,113 | 2/1995 | Sampson | 364/419.19 |

OTHER PUBLICATIONS

Robert B. Nadel, "Review of One–Write Plus Version 2.0: Accounting System for the Small, Unsophisticated Client", CPA Journal, v 59, n 2, pp. 50–55, Feb. 1989.

PC Magazine, V6, N15, P168 (2), Missing Links: an Insiders View of What you Need (but Rarely Get) from Accounting Software, G. William Dauphinus Sep. 15, 1987.

*Primary Examiner*—Frantzy Poinvil
*Attorney, Agent, or Firm*—Finnegan, Henderson, Farabow, Garrett & Dunner, L.L.P.

[57] ABSTRACT

A method for processing business activity data including providing a selected one of business activity fields, where each field represents at least one business activity, and information data associated with the selected business activity field. The method further includes providing a selected one of second business activity items associated with the selected business activity field, finding a corresponding account name in a lookup table based on the selected second business activity item and the information data, and processing the information data in accordance with the corresponding account name.

4 Claims, 4 Drawing Sheets

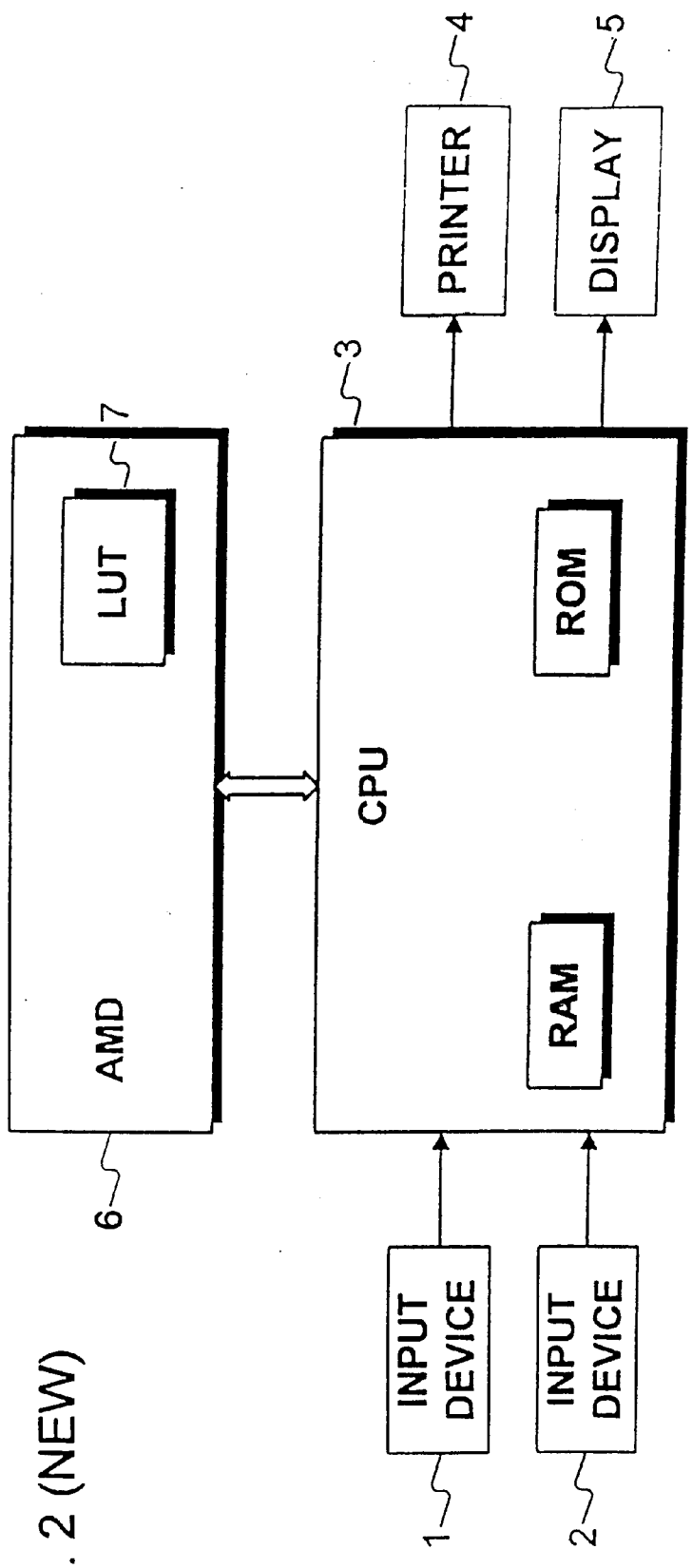
FIG. 2 (NEW)

| Debit) | Cash | $200,000 | Credit) | Product selling | $1,000,000 |
| --- | --- | --- | --- | --- | --- |
| | Chargeable bill | $300,000 | | | |
| | Selling amount on credit | $500,000 | | | |

METHOD FOR PROCESSING BUSINESS ACTIVITY FINANCIAL DATA

This application is a continuation, of application Ser. No. 08/274,708, filed Jul. 14, 1994, now abandoned.

BACKGROUND OF THE INVENTION

1. Field of the Invention

The present invention relates generally to a business activity data processing method which enables even a novice to easily carry out bookkeeping by inputting business activity data in an improved method when processing business activity using a double entry system.

2. Description of Related Art

Generally, a bookkeeper enters a transaction or deal into a system according to a conventional business data processing method and carries out bookkeeping according to given rules when the transaction occurs.

Bookkeeping begins when the bookkeeper classifies business activities into about three hundred account names and matches each of them. Specifically, the transaction is classified as either a debit or a credit of bookkeeping. The details of the debit and the credit are as follows. Increases of assets, reduction of liabilities, reduction of capital, and transactions corresponding to the occurrence of a cost are classified as debits. The reduction of assets, increases of liabilities, increases of capital, and transactions corresponding to a profit are classified as credit.

The above procedure is made by recording the data on a slip. As well known, the slip recorder must know about three hundred account names, and also an inputter should know the exact code names representing the corresponding accounts or account names to process the slips by a programmable data processing device.

FIG. 1 is a flowchart of steps in a conventional business activities data processing method. When the business activities occur, the business activities according to the transaction as a matter of the bookkeeping are recognized. They are then classified into either the debit or the credit categories, the slip is made, and an auxiliary account book is made when necessary. Next, a daily trial balance, a trial balance and a financial statement are made, thereby processing the business activities.

Conventional bookkeeping can be manually carried out only by an expert who knows the exact account names. A daily total recorded on the daily trial balance and the trial balance showing the total of all the costs of the debit and the credit are necessarily required in making the financial statement. This is because the total amount of the debit is identical with that of the credit by a principle of debit and credit in the conventional method.

Accordingly, it is impossible to input the data into current data processing devices by the conventional business activities data processing method without an expert knowledge of bookkeeping and of the accounts. Furthermore, it takes a lot of time to input the data, since the slip recorder must classify the data as either debit or credit. In addition, the purpose of a department in charge of data is distorted; the data is not useful for increasing the competitiveness of the business, since the data is not processed at the very point of time when all the activities of the business occur, but is processed in a lump later by a department in charge of bookkeeping and accounting. Therefore, a department in charge of data in the business puts more stress on processing the data than on using the data.

SUMMARY OF THE INVENTION

The object of the present invention is to overcome the problems and disadvantages of the conventional business activity data processing method.

To achieve this and other objects in accordance with the purpose of the invention, as embodied and broadly described herein, a method for processing business activity data includes providing a selected one of business activity fields, each field representing at least one business activity; providing information data associated with the selected business activity field; providing a selected one of second business activity items associated with the selected business activity field; finding a corresponding account name in a lookup table based on the selected second business activity item and the information data; and processing the information data in accordance with the corresponding account name.

According to another aspect of the present invention, a method for processing business activity data includes providing a plurality of business activity data fields, each data field representing one or more of purchasing activity, selling activity, financial activity, production activity and management activity; selecting one of the data field; selecting one of a plurality of second activity items associated with the selected data field; providing a settlement system associated with the selected second business activity item; finding a corresponding account name in a lookup table based on the selected second business activity item and the settlement system; providing information data associated with the corresponding account name; processing the information data in accordance with the corresponding account name; and providing a bookkeeping output list with an assigned account name based on the processed information data.

It is to be understood that both the foregoing general description and the following detailed description are exemplary and explanatory and are intended to provide further explanation of the invention as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 2 is a block diagram of a data processing device according to a preferred embodiment of the present invention.

DETAILED DESCRIPTION OF THE PREFERRED EMBODIMENTS

Figure 1:
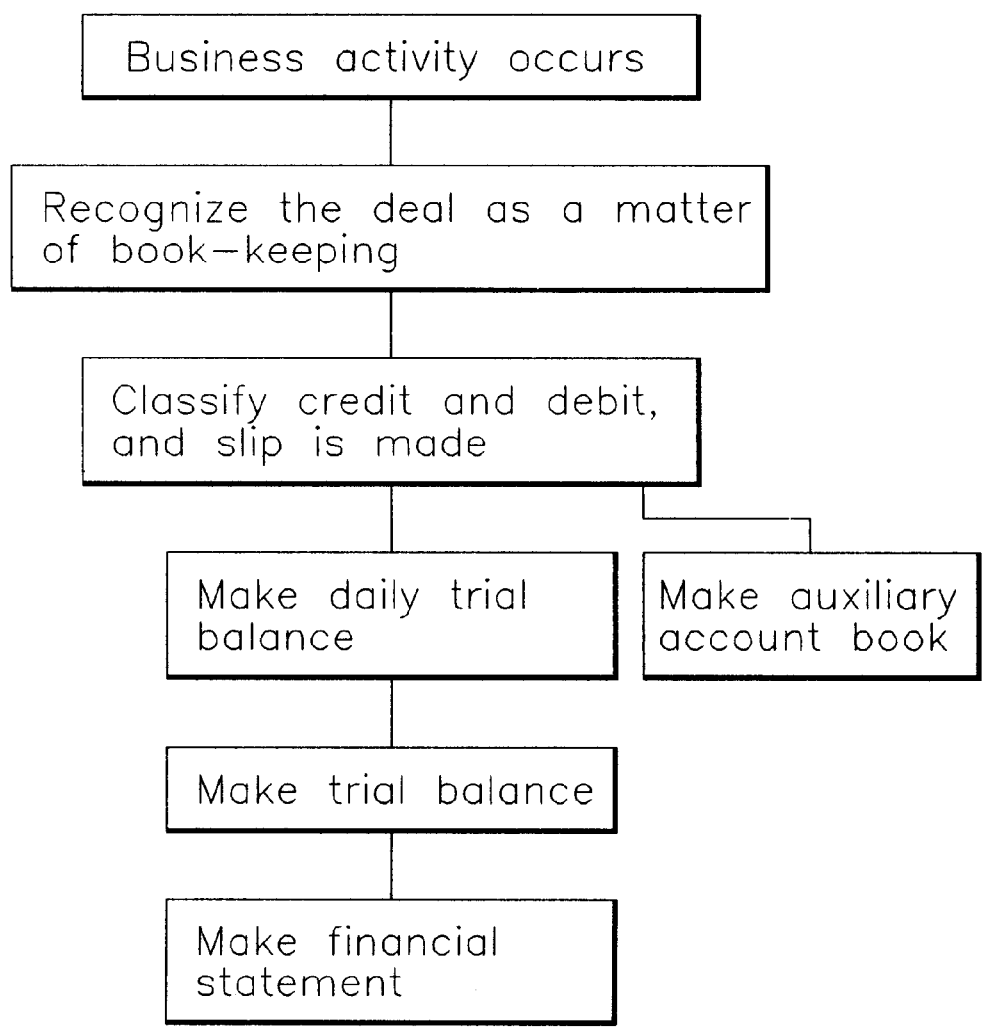
FIG. 1 is a flowchart of the steps in the conventional business activity data processing method.

Reference will now be made in detail to the preferred embodiment of the invention, an example of which is illustrated in the accompanying drawings.

In this method, referred to as Activity Information Accounting (or "AIA"), activity subjects or businesses are represented by a number, and many types of numbers representing the activities of the business are systemically processed by a double entry system. According to this method, the classification of eight elements of a transaction, the classification of a debit and a credit, and a process of making a slip are required.

Unlike in the conventional method, business activities according to the present invention are classified according to their characteristics based on the principle that surplus or loss does not occur without a reason.

Specifically, a user classifies the business activities as a purchasing activity, a selling activity, a financial activity, a production activity or management activity. Business activities are recognized by a fund and material being supplied from the outside, or being produced and sold. No preliminary procedures are carried out like making the slip or classifying the transaction as a debit or a credit as an extra input when the business activities occur.

Each field or category, classified as above is efficiently and at high speed processed by a data processing device in FIG. 2 to process the data according to the preferred embodiment of the invention before further processing.

Referring to FIG. 2, the data processing device includes a central processing unit CPU 3 for reading a program command for carrying out the method according to the preferred embodiment of the present invention and having a random access memory RAM and a read only memory ROM as the memory devices for processing the data, input devices 1, 2 for inputting the least business activity data from the outside, a display 5 for displaying a processed result of the data as an output device, a printing machine 4 and an auxiliary memory device AMD 6 connected to the CPU 3.

A keyboard, a mouse or a pointing device may be used as an input device.

The five fields classified above are represented as menus in the display. The user then checks the present business activity and determines to which field the present business activity belongs.

First, the purchasing activity variable is mainly related to the purchasing department, and sums up daily or non-daily purchasing activities like purchasing raw material, products and furniture. The selling activity is the activity of selling goods and services which are products of the business. The financial activity is the activity of supplying the necessary funds to carry out the activity. The production activity is the activity of supporting the various activities necessary for production. The management activity is the activity supporting the daily enterprise business or sales.

It is apparent that the above classifying step is not related to the assignment of the account name, and a person who works for the business can easily classify the above-mentioned business activities without special knowledge.

Figures 3, 4:
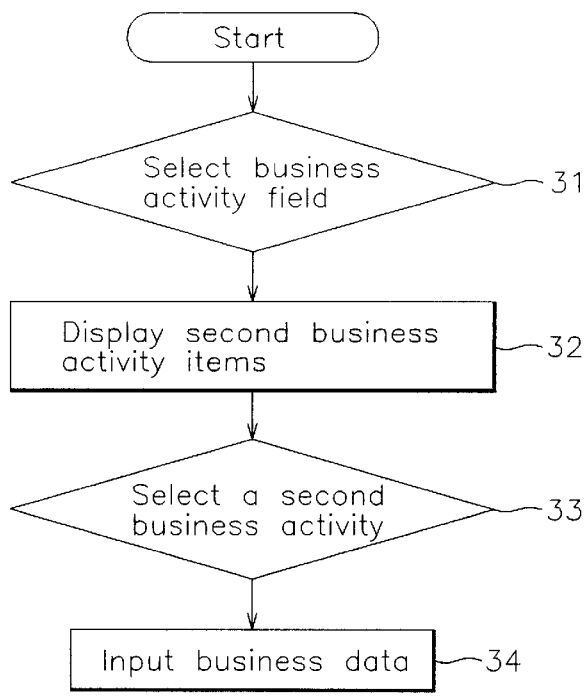
FIG. 3 is a flowchart of the steps in inputting the data according to a preferred embodiment of the present invention.
FIG. 4 is a balance sheet illustrating an example of a bookkeeping process when a transaction occurs.

When the menu for selecting the business activities field is displayed through the display 5, and the user who wants to input the business activities first selects one among the above-mentioned activities using the keyboard or the mouse, a step 31 in FIG. 3 jumps to a step 32 in the present program, and another menu is displayed to select a second activity of each field divided in detail (Step 32).

At this time, a specific item of the second business activity is not input through the keyboard by the learning of the user. Rather, the user simply selects the correct menu after reviewing the menus when the previously programmed menu of the second activity is displayed. When the menu of the displayed second business activity is selected (Step 33), the program displays another menu for inputting a number (Step 34), and likewise, the user inputs the number data according to the given number input method.

The number represents an amount of money exchanged in the business activity, and five kinds of input methods like cash, deposit, credit, a bill and a prepayment are displayed according to the present invention, since the settlement methods are various and the user inputs the number into the corresponding item according to the settlement methods.

Briefly, when one activity of the business occurs, the data input procedure is completed by the classification of the field, the classification of the second activity and the number input according to the settlement method. This procedure corresponds to the procedure of making the slip in the conventional method.

An input routine of the business activity information data will be described in detail with reference to FIG. 3.

The process is as follows. For example (as shown in FIG. 4), for a business activity in which two hundred thousand dollars (or other currency) is dealt in cash, three hundred thousand dollars is dealt in bills, and five hundred thousand dollars is dealt on credit in selling a million dollars of product.

Referring to FIG. 3, since the field of the business activity is selected in the step 31 firstly and this activity belongs to the selling activity among the five fields, the user selects the selling activity using the mouse from among the five menus on the display. Then, the program recognizes that the selling activity occurs, and the second business activity items pertaining to the selling activity are displayed on a window screen. The second activity items related with the selling activity have been prepared previously. When the user selects the "Sell product" item (Shown in FIG. 6) among the second activity items displayed on the screen, the items of the cash, the deposit, the credit, the bill and the prepayment are displayed to show the settlement method. Then, two hundred thousand dollars is inputted as cash, three hundred thousand dollars is inputted as an item of chargeable bill and five hundreds thousand dollars is inputted as credit, thereby completing the input steps of the work. Since the following process is carried out according to the steps of the present invention, the user does not take part in the process past this point.

The above-mentioned business activity will be described in detail with reference to FIG. 4 according to the conventional bookkeeping method.

When the transaction occurs, an account adjuster recognizes the transaction as a matter of bookkeeping, classifies the deal as either a debit or a credit as learned, and assigns the cash of two hundred thousand dollars, the chargeable bill of three hundred thousand dollars and the selling amount on credit of five hundred thousand dollars in the debit, and the product selling of a million dollars in the credit in the accounts. The account name used here is one of about three hundred; a predetermined account name is necessarily used, and a great deal of special learning is required to adjust the account as shown in FIG. 4.

The bookkeeping as well as the input is already made in FIG. 4, but the business activity information data is simply inputted in the case of the present invention as shown in FIG. 3. However, the following description will show that the business activity information data is automatically processed on the basis of the above inputted data.

The inputted data of FIG. 3 is temporarily stored in the obtained area of the random access memory RAM in FIG.

2. The data produced by the occurrence of one business activity is the item of a second business activity and the number related with the item. At this item, the number of the total amount of the cash, the deposit, the credit, the bill and the prepayment is used in the case of the number. The total settlement amount S in the above-mentioned example is a million dollars.

In the present invention, the data is processed, using the matching table of the account name previously prepared, and this table is stored in a floppy disk or a hard disk and is referred to by a file access on the program. The stored data on the table is the account name required in the bookkeeping for the group B, and the second business activity items for the group A. These are matched with a predetermined relation to one another without inconsistency. The data representing the reduction (−) and the increase (+) is assigned in each account name of the bookkeeping. Specifically, '+' represents the increase of the assets, the liabilities, the capital, the profit and the cost, and '−' represents the reduction of assets, the liabilities, the capital, the profit and the cost. Firstly, a predetermined matching relation is set after referring to the second business activity item, the settlement method item and the total settlement amount S inputted in a step 51 in FIG. 5, and to the matching table, referred to as lookup table or ("LUT") of the account name in a memory area 7 (shown FIG. 2) in a step 52. The above-mentioned example will be described as shown in FIG. 6.

Provided that the above-mentioned example is a deal or transaction 1, the product selling which corresponds to a second activity item "Sell product" is recorded in the group A for the deal 1, and only the occurred total amount S is inputted as a million dollars. When referring to the matching relation of the account name of the bookkeeping in the group B for the product selling, the product selling matches the product selling (+) in the group B, and the selection of the account name will be used as the information processing data. Furthermore, the items in the group A according to the settlement method in the deal 1 are the two hundred thousand dollars of cash, the three hundred thousand dollars of the bill and the five hundred thousand dollars on credit, and these items match the cash (+), the chargeable bill (+) and the selling amount on credit (+), respectively.

The assignment procedure will be applied in the same manner to a deal 2, a deal 3 and so on.

Figure 5:
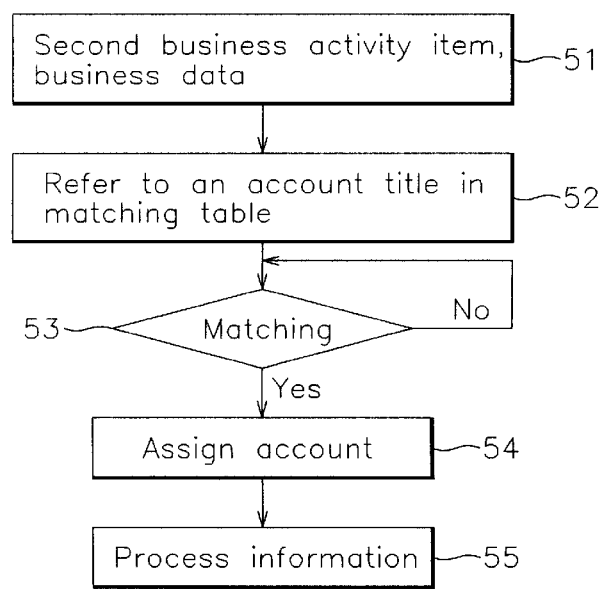
FIG. 5 is a flowchart of the steps in changing and assigning the account name according to a preferred embodiment of the present invention.
Figure 6:
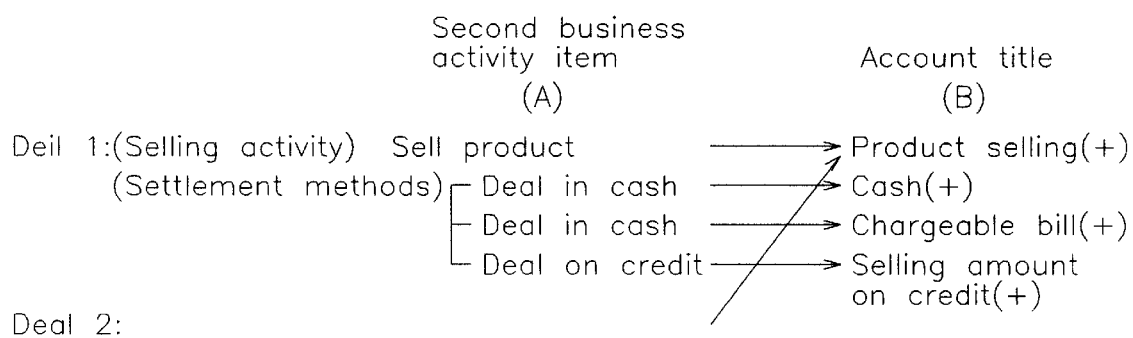
FIG. 6 is a diagram depicting the steps for assigning the account name in FIG. 5.

A step 53 in FIG. 5 is the step for setting the above-mentioned matching relation. The items of the second activity are matched by a more detailed table in the group A in a reference table according to the five fields of the business activity in the preferred embodiment of the present invention. In the example of the above-mentioned deal 1, the product selling in the selling activity is assigned according to the predetermined table in the group A, and is automatically converted into the account name of the bookkeeping according to the predetermined matching relation with the group B.

The initial input data which will be used when matching is stored as a data file in another storage area like a floppy disk to be used later.

As described above, after the conversion procedure of the account name, the balance sheet, the trial balance, a statement of profit and loss, a cost bill and an expense account bill are generated. This has the same effect as when the data is inputted to the data processing device using a slip, and the post-processing can be carried out in the conventional method.

The effect of the business activity data processing method according to the present invention is that the processing time is sharply shortened, competitiveness of the business is increased owing to a high degree of efficiency in business. The processing method is also particularly easy to use.

Other embodiments of the invention will be apparent to those of ordinary skill in the art from the specification and practice of the invention disclosed herein. It is intended that the specification and examples be considered as exemplary only, with a true scope and spirit of the invention being indicated by the following claims and their equivalents.

What is claimed is:

1. A computer implemented method for processing business activity data in a data processing system containing a plurality of secondary business activity items and corresponding account names, comprising the steps of:

displaying a plurality of primary business activity categories selected from a group comprising a purchasing activity, a selling activity, a financial activity, a production activity, and a management activity;

receiving a user selection of one of the displayed primary business activity categories;

displaying a plurality of secondary business activity items associated with said selected primary business activity category;

receiving a user selection of one of the displayed secondary business activity items;

displaying at least one possible settlement category in response to the selected secondary business activity item;

receiving a user selection of one of the displayed settlement categories;

receiving from the user an amount of account to settle the selected primary business activity category;

retrieving a corresponding account name from the data processing system in response to the selected secondary business activity item and the selected settlement category; and processing the received amount in accordance with the retrieved account name to be assigned to a respective field of said account name.

2. The method of claim 1, wherein the retrieving step includes the substep of retrieving reference information corresponding to said selected secondary business activity item from a first portion of a lookup reference table and said account name in a second portion of the lookup reference table.

3. The method of claim 1, further comprising the step of providing a bookkeeping output list including an assigned account name.

4. The method of claim 1, wherein each account name includes information representing an increase or decrease characteristic of said received amount.

* * * * *

UNITED STATES PATENT AND TRADEMARK OFFICE
CERTIFICATE OF CORRECTION

PATENT NO. : 6,085,173  
DATED : July 4, 2000  
INVENTOR(S) : Won-Kyo Suh

It is certified that error appears in the above-identified patent and that said Letters Patent is hereby corrected as shown below:

Title page,  
In the Drawings; and  
In Figure 6, "Deil 1" should read -- Deal 1 --; and  
*After "Deal 2" insert 2 rows of vertical dotted lines as shown below:

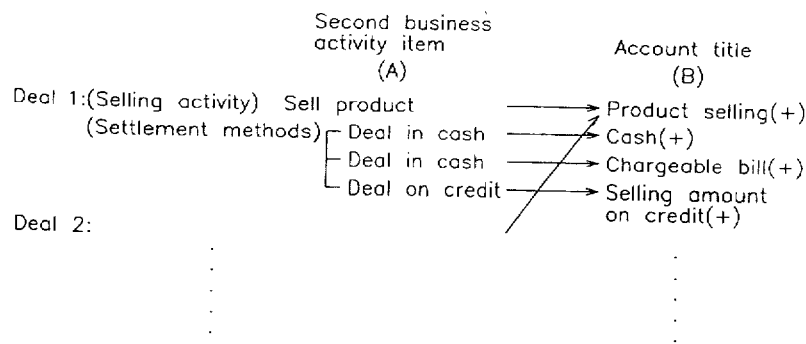

Signed and Sealed this

Twenty-seventh Day of November, 2001

Attest:

NICHOLAS P. GODICI  
Attesting Officer  
Acting Director of the United States Patent and Trademark Office